United States Patent
Fahadullah et al.

(10) Patent No.: US 9,740,701 B1
(45) Date of Patent: Aug. 22, 2017

(54) SNAPSHOT CAUTERIZATION

(71) Applicant: EMC Corporation, Hopkinton, MA (US)

(72) Inventors: Mohd Fahadullah, Seattle, WA (US); Kamal J Charan, Banglore (IN); Vikrama Reddy, Bangalore (IN); Prasad Krishnan, Bangalore (IN); Sandeep Joshi, Campbell, CA (US)

(73) Assignee: EMC IP Holding Company, Hopkinton, MA (US)

( * ) Notice: Subject to any disclaimer, the term of this patent is extended or adjusted under 35 U.S.C. 154(b) by 275 days.

(21) Appl. No.: 14/320,551

(22) Filed: Jun. 30, 2014

Related U.S. Application Data

(60) Provisional application No. 61/877,597, filed on Sep. 13, 2013.

(51) Int. Cl.
*G06F 17/30* (2006.01)

(52) U.S. Cl.
CPC .. *G06F 17/30088* (2013.01); *G06F 17/30303* (2013.01)

(58) Field of Classification Search
CPC ......... G06F 17/30088; G06F 17/30212; G06F 11/1469; G06F 11/1435; G06F 17/3015; G06F 2201/84; G06F 11/1402; G06F 9/4856; G11B 7/24056; G11B 7/038; G11B 25/04; G11B 2212/224
See application file for complete search history.

(56) References Cited

U.S. PATENT DOCUMENTS

| | | | | |
|---|---|---|---|---|
| 8,190,850 | B1* | 5/2012 | Davenport | G06F 17/30067 711/170 |
| 2003/0158861 | A1* | 8/2003 | Sawdon | G06F 11/1435 714/E11.072 |
| 2003/0159007 | A1* | 8/2003 | Sawdon | G06F 11/1435 711/154 |
| 2006/0075294 | A1* | 4/2006 | Ma | G06F 11/1451 714/13 |
| 2007/0174580 | A1* | 7/2007 | Shulga | G06F 3/0607 711/170 |
| 2008/0059541 | A1* | 3/2008 | Fachan | G06F 17/30088 707/E17.01 |
| 2008/0114951 | A1* | 5/2008 | Lee | G06F 11/1469 711/162 |
| 2008/0177957 | A1* | 7/2008 | Lee | G06F 11/1471 711/161 |
| 2008/0183995 | A1* | 7/2008 | Satoyama | G06F 11/1435 711/162 |
| 2008/0209264 | A1* | 8/2008 | Morse | G06F 11/0706 714/6.32 |

(Continued)

*Primary Examiner* — Anh Ly
(74) *Attorney, Agent, or Firm* — Krishnendu Gupta

(57) ABSTRACT

Implementations disclosed herein provide for cauterizing portions of a snapshot. A file and/or directory or a set of files and directories of a snapshot can be identified via a user request or an automated process for cauterization. When cauterized, if a previous snapshot does not contain a ditto entry to the portion of the current snapshot that is requested to be cauterized, the BADDR associated with the cauterized portion of the snapshot can be freed for other storage use. In some implementations, metadata associated with the data that is cauterized can be retained for other uses.

12 Claims, 3 Drawing Sheets

(56) References Cited

U.S. PATENT DOCUMENTS

| | | | |
|---|---|---|---|
| 2008/0281875 A1* | 11/2008 | Wayda | G06F 11/1435 707/E17.005 |
| 2008/0281877 A1* | 11/2008 | Wayda | G06F 11/1435 707/E17.005 |
| 2009/0055604 A1* | 2/2009 | Lemar | G06F 11/1435 711/161 |
| 2009/0055607 A1* | 2/2009 | Schack | G06F 11/1435 711/162 |
| 2009/0327372 A1* | 12/2009 | Ylonen | G06F 12/0253 707/E17.005 |
| 2010/0174879 A1* | 7/2010 | Pawar | G06F 3/0608 711/161 |
| 2012/0166757 A1* | 6/2012 | Volvovski | G06F 17/30 711/206 |

* cited by examiner

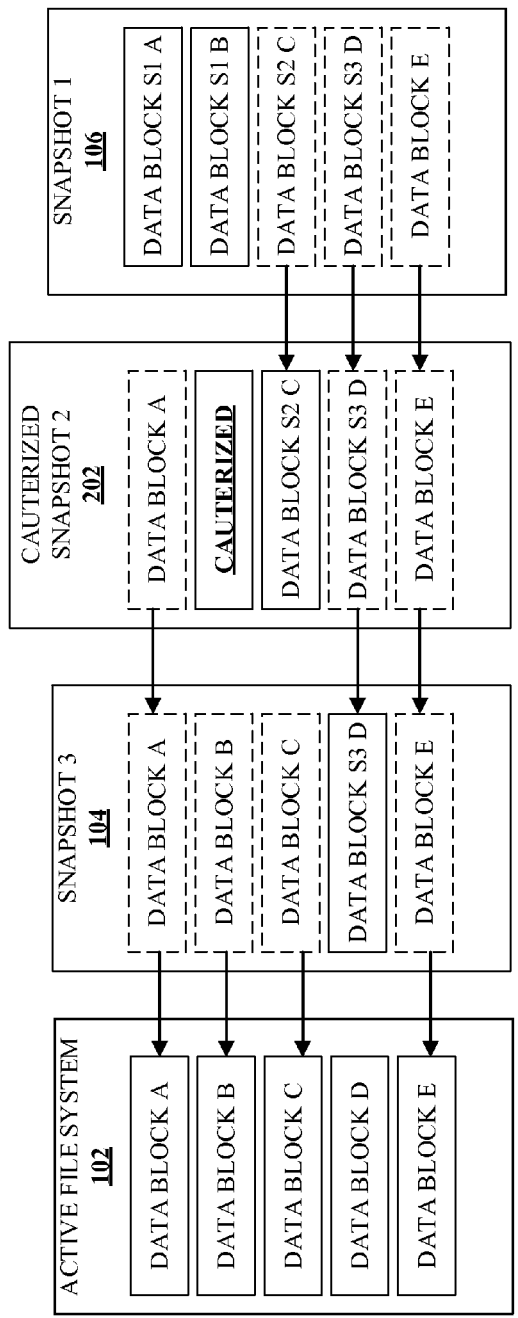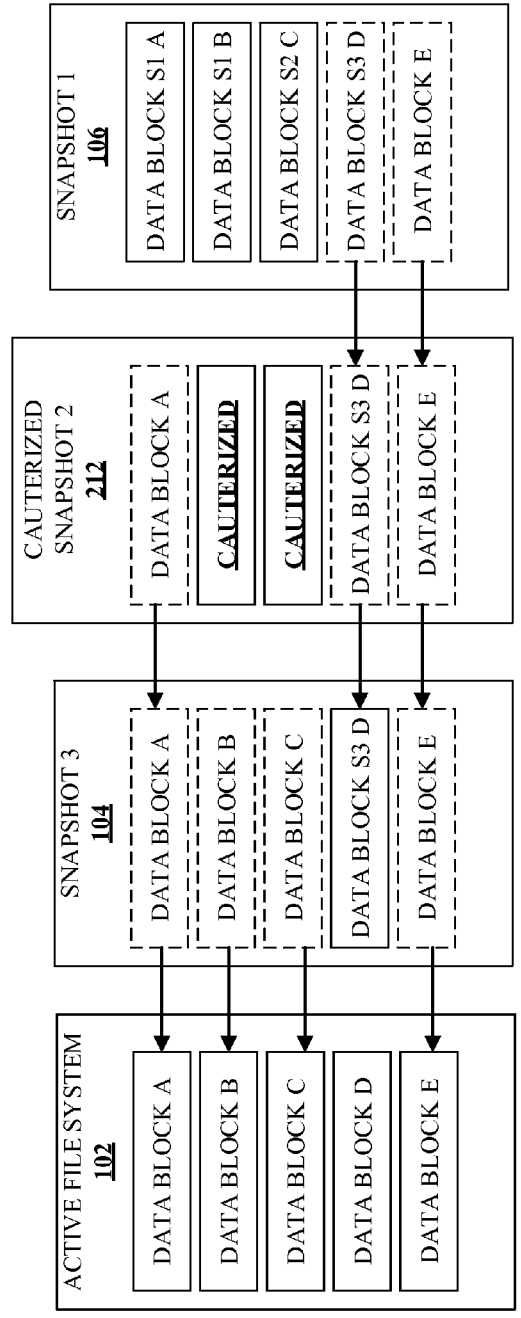

SNAPSHOT CAUTERIZATION

CROSS REFERENCE TO RELATED APPLICATIONS

This application claims priority to co-pending U.S. Provisional patent application Ser. No. 13/113,969 for Snapshot Cauterization filed Sep. 13, 2013, which is incorporated herein by reference for all purposes.

FIELD OF THE INVENTION

This invention relates generally to processing data, and more particularly to systems and methods for cauterizing snapshot data.

BACKGROUND OF THE INVENTION

Computer systems not only store data to be accessed both locally and through a network but they are also capable of performing a wide variety of data protection technologies. Data protection technologies can include, for example, backups, mirroring, snapshots, etc. Typically, the data stored on storage devices undergo modifications. Modifications can arise from user intervention, periodic system updates or alternations, computer initiated processes, or some other source. Whatever the source of the modifications, it is often useful to preserve and permit access to previous versions of the data such as, for example, files, directories and metadata.

Snapshots in general provide for taking a moment in time "snapshot" of a file, a directory, metadata, a group files, etc. If the files are later changed, a user can access the previous version of the file residing within a snapshot. For example, in a snapshot system which uses a Copy on Write ("CoW") method, a snapshot of the data is taken at the time the data is first updated, e.g., storing the original data in the CoW snapshot and then updating the original data in its resident storage device. Thus, as original data that is a part of the snapshot is modified, deleted, written over, etc., the size of the snapshot can grow proportionately. As the amount of snapshots increase, the size necessary for snapshot storage can also increase.

One way of reducing the storage requirements for a set of snapshots is to provide for the deletion of a snapshot. For example, suppose a portion of a file system is used to develop an upcoming software release and during its development, snapshots are taken on a daily basis in order to preserve changes to files during the development process. When the software is release, there may no longer be a need to access previous versions of the software. Thus, a user can delete the entirety of a snapshot and potentially reclaim disk space. However, continuing the example, there may be cases where other data beyond software development data is retained within the daily snapshots, and that data is desirable to retain. In most cases, snapshots must be deleted in their entirety and there is no flexibility in selectively deleting individual files within an individual snapshot. Thus there is a need to provide flexibility in selectively deleting portions of a snapshot to free up data retained in a snapshot while continuing to retain wanted snapshot data.

Providing local and network access to data blocks or data files along with employing a myriad of data protection technologies often correlates to a competition for computer system resources. For example, most storage devices are limited in the amount of reads and writes that can take place during any given time period. If after every write to a storage device, a second write is made to backup device, a third write is made to a mirror, and a fourth write is made to a snapshot storage device, performance of the system during these consecutive or parallel read/writes may suffer.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In one implementation, a request to cauterize a snapshot can be received, wherein the request includes a set of cauterized items, wherein a cauterized item in the set of cauterized items are at least one of a file or a directory. It can be iteratively determined, for cauterized items in the set of cauterized items, whether a previous snapshot is associated with the cauterized item. In response to determining that that a previous snapshot is not associated with the cauterized item, a block address associated with the cauterized item can be freed for other use. In response to determining that that a previous snapshot is associated with the cauterized item, it can be determined whether a ditto record is associated with the cauterized item within the previous snapshot. In response to determining that a ditto record is not associated with the cauterized item within the previous snapshot, a block address associated with the cauterized item can be freed for other use. In response to determining that a ditto record is associated with the cauterized item within previous snapshot, the ditto record within the previous snapshot can be modified to indicate that the block address associated with the cauterized item is being retained by the previous snapshot.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIGS. 2A and 2B illustrate example block diagrams of an active file system and a succession of snapshots associated with the file system, including cauterized portions of snapshots in accordance with implementations of this disclosure.

DETAILED DESCRIPTION

Figure 1A:
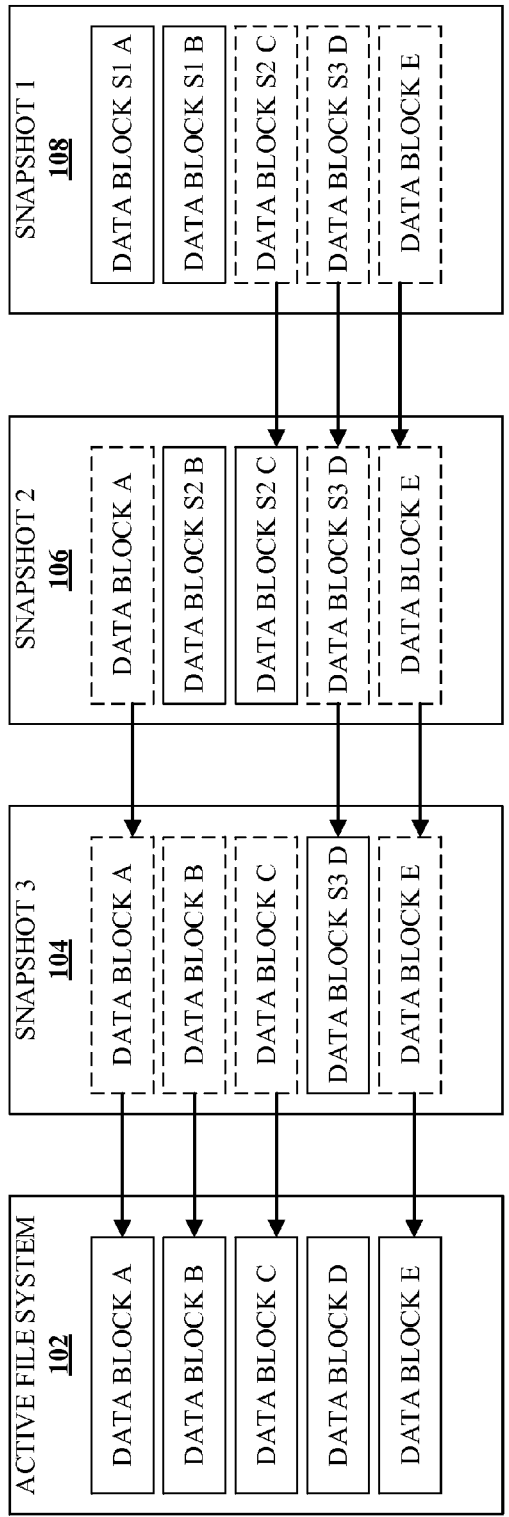
FIG. 1A illustrates an example block diagram of an active file system and a succession of snapshots associated with the file system.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The following patents are hereby incorporated by reference and describe various systems and methods for a snapshot of data: "Systems and Methods for a Snapshot of Data" U.S. Pat. No. 7,680,836; "Systems and Methods for a Snapshot of Data" U.S. Pat. No. 7,680,842; "Systems and Methods for a Snapshot of Data" U.S. Pat. No. 7,882,071; "Systems and Methods for a Snapshot of Data" U.S. Pat. No. 7,953,704; "Systems and Methods for a Snapshot of Data" U.S. Pat. No. 8,010,493; "Systems and Methods for a Snapshot of Data" U.S. Pat. No. 8,015,156; "Systems and Methods for a Snapshot of Data" U.S. Pat. No. 8,356,013; and "Systems and Methods for portals into Snapshot Data" U.S. Pat. No. 7,949,692.

In a snapshot system which use a Copy on Write ("CoW") method, a snapshot of the data is taken at the time the data is first updated, e.g., storing the original data in the CoW snapshot and then updating the original data in its resident storage device. Thus, when a processor of the computer system receives an instruction to modify the original data block of the particular storage volume (e.g., a write instruction, a read-modify-write instruction, etc.), a snapshot process takes place where the original data blocks are moved or associated with the snapshot and the newly modified data blocks are stored as the active file within the data system.

Referring now to FIG. 1A, there is illustrated an example block diagram of an active file system and a succession of snapshots associated with the file system. As described in the above referenced patents that are incorporated by reference, a logical model, a physical model, a hybrid model, or a log-based model can be used as file structure implementations for snapshots. It can be appreciated that FIGS. 1A, 1B, 2A, and 2B can be implemented in any of the referenced file structure implementations. For example, in FIG. 1A, Data Block E in Active File System 102 references a Block Address location(s) ("BADDR") where the data in Data Block E stored. BADDRs are used to refer to the physical address of a data block on disk. Snapshot 1 108 Data Block E, Snapshot 2 106, Data Block E, and Snapshot 3 104 Data Block E all reference the same BADDR location which can be referenced under the logical model, physical model, hybrid model, log-based model or other means of pointing to BADDR locations.

Snapshot 1 108 represents the earliest in time snapshot depicted in FIG. 1A. Snapshot 2 106 is taken after Snapshot 1 108 but prior to Snapshot 3 104. As shown in FIG. 1A, when a future version of a snapshot references the same data for a file and/or directory, the data block is stored and/or associated with the latest occurring snapshot. For example, Data Block S2 C was modified at a point in time after snapshot 2 106 was taken but prior to when Snapshot 3 104 was taken. Snapshot 1 108 points to Data block S2 C that resides in Snapshot 2 106 as Snapshot 2 106 is the latest occurring snapshot to reference the same file. Similarly, Data Block S3D was modified at a point in time after Snapshot 3 104 was taken and is stored within and/or associated with Snapshot 3 104. Snapshot 2 106 and Snapshot 1 108 point to Data block S3 D in Snapshot 104. It can be appreciated that the arrow from Data Block S3 D in Snapshot 1 108 to Data Block S3 D in Snapshot 2 106 could alternatively point directly to Data Block S3 D in Snapshot 3 104 in some implementations.

As the most recent version of a snapshot that references the same data for a file or directory "stores" or is associated with a BADDR for that file or directory, deleting a snapshot does not always free up BADDR for other storage. For example, referring now to FIG. 1B, there is illustrated an example block diagram of an active file system and a succession of snapshots associated with the file system, after a snapshot has been deleted.

Figure 1B:
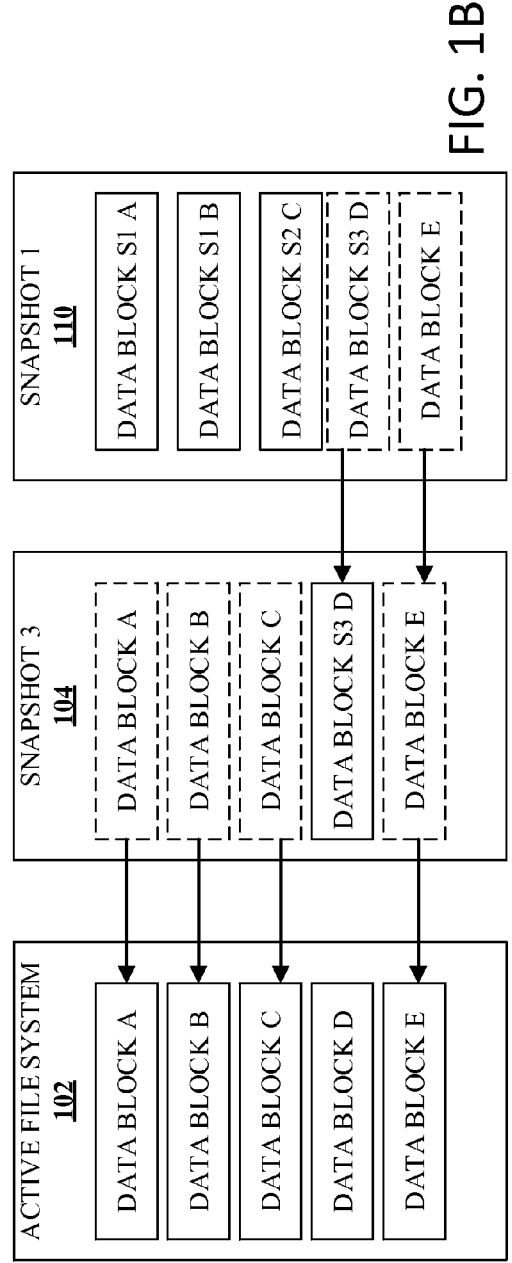
FIG. 1B illustrates an example block diagram of an active file system and a succession of snapshots associated with the file system, after a snapshot has been deleted.

As described in the above referenced patents that are incorporated by reference, to delete a snapshot in its entirety, the process begins by accepting a delete snapshot request from a user, client application, or other source. All files and/or directories within the snapshot tracking file are considered. As described in the references, the snapshot tracking file comprises a list of all files and directories that were modified or deleted after the snapshot was created. FIG. 1B represents the result of a delete snapshot request for Snapshot 2 106 from FIG. 1A.

In deleting each considered file from Snapshot 2 106 from FIG. 1A, e.g., data blocks, the process examines whether a previous snapshot refers the snapshot to be deleted. If there is no previous governing snapshot, the snapshot version of the considered file or directory can be deleted. In the depicted example, there was a previous governing snapshot, Snapshot 1 108, thus the snapshot version of the considered file or directory cannot be deleted outright.

If there is a previous snapshot, it can be determined whether the particular BADDR location in the previous version contains a ditto entry and if so, the data is copied from the deleted snapshot file to the previous version of the file. For example, Data Block S2 C from Snapshot 1 108 in FIG. 1A is a ditto entry for the BADDR location in Snapshot 2 106 for Data Block S2 C. Thus, when deleting Snapshot 2 106, as shown in FIG. 1B, the BADDR for Data Block S2 C is copied into updated snapshot 1 110. The only BADDR referenced in Snapshot 2 106 that is not referenced by a ditto entry in a previous snapshot was Data Block S2B. Thus, in deleting the entirety of Snapshot 2 106, the sole snapshotted BADDR freed and released for other storage needs was Data Block S2B that was not mentioned by a Ditto record in a previous snapshot.

Referring now to FIG. 2A, there is illustrated an example block diagram of an active file system and a succession of snapshots associated with the file system, including a cauterized snapshot in accordance with implementations of this disclosure. The File System and successive snapshots as shown in FIG. 2, represent the same File System and successive snapshots as shown on FIG. 1A. Instead of deleting Snapshot 2 106 in its entirety as shown in FIG. 1B, portions of Snapshot 2 202 can be cauterized under implementations of this disclosure.

Implementations disclosed herein provide for cauterizing portions of a snapshot. A file and/or directory or a set of files and directories of the snapshot can be identified via a user request or an automated process for cauterization. When cauterized, if a previous snapshot does not contain a ditto entry to the portion of the current snapshot that is requested to be cauterized, the BADDR associated with the cauterized portion of the snapshot can be freed for other storage use. For example, as shown on FIG. 2A, Cauterized Snapshot 2 202 has had Data Block S2 B cauterized. Because Data Block S2 B did not have a previous snapshot (e.g., Snapshot 1 106) reference Data Block S2 B in a ditto entry, the block can be free for other storage. In a second example, as shown on FIG. 2B, Data Block S2 C was cauterized; however, originally, as depicted in FIG. 1, Snapshot 1 106 had a ditto record referencing Data Block S2 C. In this example, Data Block S3 D, when cauterized, was moved/transferred/associated to Snapshot 1 106 and no space was freed for additional storage as the BADDR referencing Data Block S2 C is necessary to maintain integrity for Snapshot 1 106.

In some implementations, metadata associated with cauterized files and/or directories is retained. For example, in FIG. 2A, Data Block S2 B was cauterized and the BADDR was freed for other use. However, the metadata associated with Data Block S2B including the size, age, author, history, etc., can be retained even after freeing the BADDR associated with the data for other use. The metadata retained relates to the data of the BADDR prior to it being written over after being freed for other use. For example, metadata attributes related to file size, time, owner, are retained as if the file still resides in the BADDR. Thus, it can be appreciated that even when freeing a BADDR for other use, the metadata that is retained, can still provide useful information.

In one implementation, the entirety of BADDRs associated with the snapshot can be cauterized, and any BADDR necessary for retention in previous snapshots can inherit necessary data; however, metadata associated with the entire snapshot is retained. In this sense, a metadata only snapshot can be taken. It can be appreciated that a metadata only snapshot does not store changes to user data. In one implementation, a metadata only snapshot can continue to store CoW original metadata after any metadata changes occur in the active file system in the snapshot location even after cauterization. It can be appreciated that metadata only snapshot can be useful in providing metadata to analytics clients and the like to produce analytic reports on various aspects of file system usage over time.

In one implementation after data blocks are cauterized they cannot be restored. In one implementation, cauterized data blocks, e.g., data blocks in BADDRs that are not retained by a previous snapshot, can be sent to a secondary storage device, for example, a cloud storage device, for later retrieval and restoration. It can be appreciated that metadata associated with the data blocks can also be sent to cloud storage to provide information on the identity of the data stored in cloud storage, the age of the data, the size of the data, the author of the data, etc. In another implementation, a stub can created and maintained in place of the original BADDR data that describes the location of the moved cauterized data and other metadata associated with the moved cauterized data.

In one implementation, a snapshot cauterization user utility can iterate through a series of snapshots to selectively cauterize all or a portion of the series of snapshots.

In one implementation, a snapshot cauterization user utility can provide to a user an amount of space that can be freed up by a proposed snapshot cauterization.

In one implementation, snapshots can be blocked from snapshot cauterization. For example, a single flag or multiple flags can be associated with a snapshot where if the flag(s) are set the snapshot or portions of the snapshot are not allowed to be cauterized. In another example, a name of a snapshot can signify whether all or a portion of the snapshot is blocked. It can be appreciated that a snapshot necessary for backup and recovery functions may be flagged to prevent a user from cauterizing a snapshot that another user or an automated process has identified as necessary to retain in its entirety. In one implementation, files, directories or sets of files and directories can be blocked individually or as a group from being cauterized. For example, in a snapshot containing five files, two of the five files can be blocked from cauterization while allowing the remaining three to be cauterized.

In one implementation, only the oldest snapshot associated with a file and/or directory can be cauterized. It can be appreciated that by limiting cauterization to the oldest snapshot, the file being cauterized should not have any older data blocks. In one implementation, only serial snapshot cauterization is provided where a user must serially cauterize, starting from the oldest snapshot, if a newer snapshot is requested to be cauterized.

Figure 3:
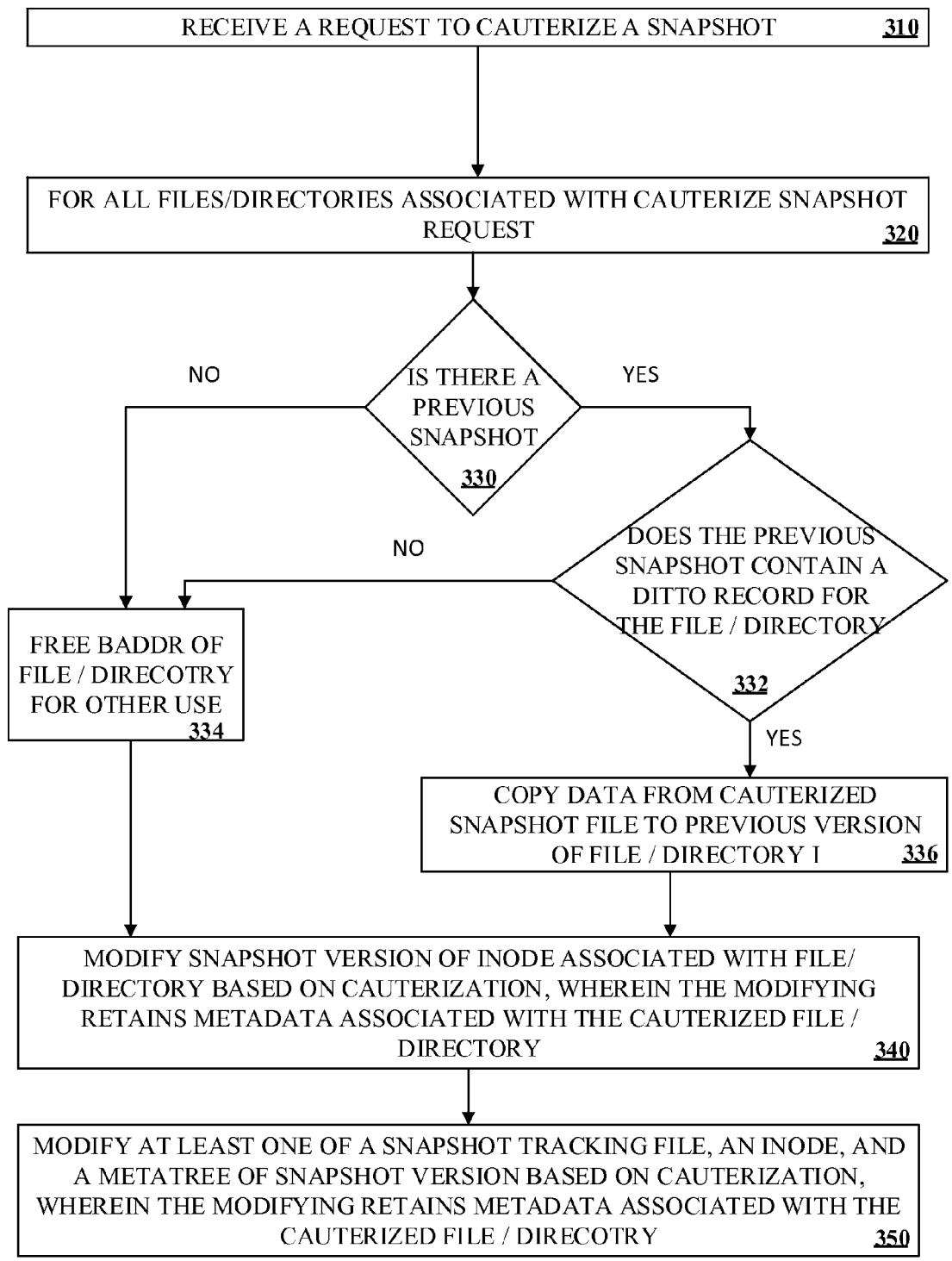
FIG. 3 illustrates an example method for cauterization a snapshot in accordance with implementations of this disclosure.

FIG. 3 illustrates a method and/or flow diagram in accordance with this disclosure. For simplicity of explanation, the methods are depicted and described as a series of acts. However, acts in accordance with this disclosure can occur in various orders and/or concurrently, and with other acts not presented and described herein. Also, the subject of each of these steps (acts), further described below, can be a single BADDR, range of BADDRS, groups of ranges of BADDRS, a mix of these, whole file, directory, etc. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At 302, a request to cauterize a snapshot can be received. For example, the request can include a snapshot identifier that identifies the snapshot the request is seeking to cauterize. The request can also include a list of files or directories within the snapshot that the request is seeking to cauterize. At 320, all files and directories associated with the request can be identified based on the request. It can be appreciated that the individual files and/or directories can iteratively or in parallel start the process starting with step 330. At 330, it is determined whether there was a previous snapshot to the snapshot associated with the request.

If there was not a previous snapshot, at 334, the BADDR of the file or directory can be cauterized and freed for other use.

If there was a previous snapshot, at 332, it can be determined whether the previous snapshot contains a ditto record for the file directory. If the previous snapshot does not contain a ditto record from, at 334, the BADDR of the file or directory can be cauterized and freed for other use. If the previous snapshot does contain a ditto record, at 336, data can be copied from the cauterized snapshot file to a previous snapshot version of the file/directory. For example, if the previous record contains a ditto entry, the BADDR can be retained and the previous snapshot entry can retain storage of the BADDR or point to the BADDR location. It can be appreciated that depending on whether a logical model, physical model, hybrid model or log-based model, the retention of the BADDR or how the previous snapshot points to the BADDR may be different; however, the effect is the same, in that the data within the BADDR is retained for use by the previous snapshot.

At 340, the snapshot version of the inode associated with the file/directory can be modified based on the cauterization, wherein the modifying retains metadata associated with the cauterized file/directory. It can be appreciated that in other implementations, metadata need not be retained.

At 350, a snapshot tracking file, an inode, and a metatree of the snapshot version associated with the cauterization request can be modified based on the cauterization, wherein the modifying retains metadata associated with the cauterized file/directory. It can be appreciated that in other implementations, metadata need not be retained.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The invention claimed is:

1. A method comprising:
receiving a request to cauterize a portion of a snapshot, wherein the request includes a set of cauterized items, wherein a cauterized item in the set of cauterized items are at least one of a file or a directory, and wherein cauterizing the portion of the snapshot does not delete the snapshot; and
cauterizing the portion of the snapshot by iteratively, for cauterized items in the set of cauterized items:
determining whether a previous snapshot is associated with the cauterized item;
in response to determining that that a previous snapshot is not associated with the cauterized item, freeing a block address associated with the cauterized item for other use;
in response to determining that that a previous snapshot is associated with the cauterized item, determining whether a ditto record is associated with the cauterized item within the previous snapshot;
in response to determining that a ditto record is not associated with the cauterized item within the previous snapshot, freeing a block address associated with the cauterized item for other use; and
in response to determining that a ditto record is associated with the cauterized item within previous snapshot, modifying the ditto record within the previous snapshot to indicate that the block address associated with the cauterized item is being retained by the previous snapshot.

2. The method of claim 1, further comprising:
in response to freeing the block address associated with the cauterized item for other use, retaining metadata associated with the cauterized item.

3. The method of claim 1, further comprising:
modifying a snapshot tracking file, an inode, and a metatree associated with the snapshot based on the request.

4. The method of claim 1, further comprising:
estimating an amount of space that can be freed based on the request.

5. A system comprising for protecting data, comprising at least one storage device and at least one processor configured to:
receive a request to cauterize a portion of a snapshot, wherein the request includes a set of cauterized items, wherein a cauterized item in the set of cauterized items are at least one of a file or a directory, and wherein cauterizing the portion of the snapshot does not delete the snapshot; and
cauterize the portion of the snapshot by iteratively, for cauterized items in the set of cauterized items:
determine whether a previous snapshot is associated with the cauterized item;
in response to determining that that a previous snapshot is not associated with the cauterized item, free a block address associated with the cauterized item for other use;
in response to determining that that a previous snapshot is associated with the cauterized item, determine whether a ditto record is associated with the cauterized item within the previous snapshot;
in response to determining that a ditto record is not associated with the cauterized item within the previous snapshot, free a block address associated with the cauterized item for other use; and
in response to determining that a ditto record is associated with the cauterized item within previous snapshot, modify the ditto record within the previous snapshot to indicate that the block address associated with the cauterized item is being retained by the previous snapshot.

6. The system of claim 5, further configured to:
in response to freeing the block address associated with the cauterized item for other use, retain metadata associated with the cauterized item.

7. The system of claim 5, further configured to:
modify a snapshot tracking file, an inode, and a metatree associated with the snapshot based on the request.

8. The system of claim 5, further configured to:
estimate an amount of space that can be freed based on the request.

9. A computer readable medium with program instructions stored thereon to perform the following acts:

receiving a request to cauterize a portion of a snapshot, wherein the request includes a set of cauterized items, wherein a cauterized item in the set of cauterized items are at least one of a file or a directory, and wherein cauterizing the portion of the snapshot does not delete the snapshot; and cauterizing the portion of the snapshot by iteratively, for cauterized items in the set of cauterized items:
- determining whether a previous snapshot is associated with the cauterized item;
- in response to determining that that a previous snapshot is not associated with the cauterized item, freeing a block address associated with the cauterized item for other use;
- in response to determining that that a previous snapshot is associated with the cauterized item, determining whether a ditto record is associated with the cauterized item within the previous snapshot;
- in response to determining that a ditto record is not associated with the cauterized item within the previous snapshot, freeing a block address associated with the cauterized item for other use; and
- in response to determining that a ditto record is associated with the cauterized item within previous snapshot, modifying the ditto record within the previous snapshot to indicate that the block address associated with the cauterized item is being retained by the previous snapshot.

10. The computer readable medium of claim 9, further comprising:
in response to freeing the block address associated with the cauterized item for other use, retaining metadata associated with the cauterized item.

11. The computer readable medium of claim 9, further comprising:
modifying a snapshot tracking file, an inode, and a metatree associated with the snapshot based on the request.

12. The computer readable medium of claim 9, further comprising:
estimating an amount of space that can be freed based on the request.

* * * * *